Figure 1:
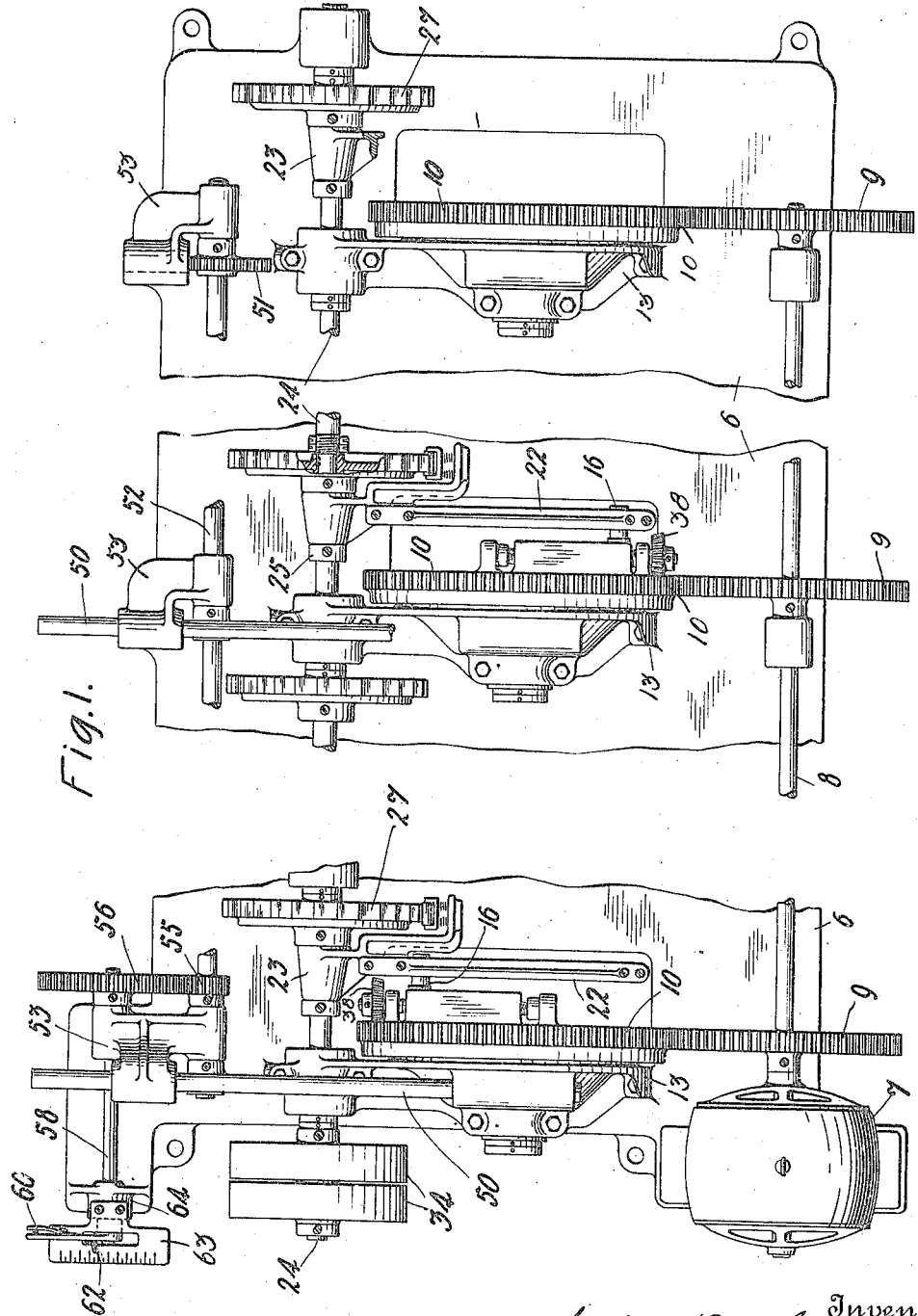

W. E. THOMAS.
VARIABLE SPEED TRANSMISSION MECHANISM.
APPLICATION FILED JUNE 23, 1917.

1,254,743.

Patented Jan. 29, 1918.
3 SHEETS—SHEET 1.

Inventor
William E. Thomas

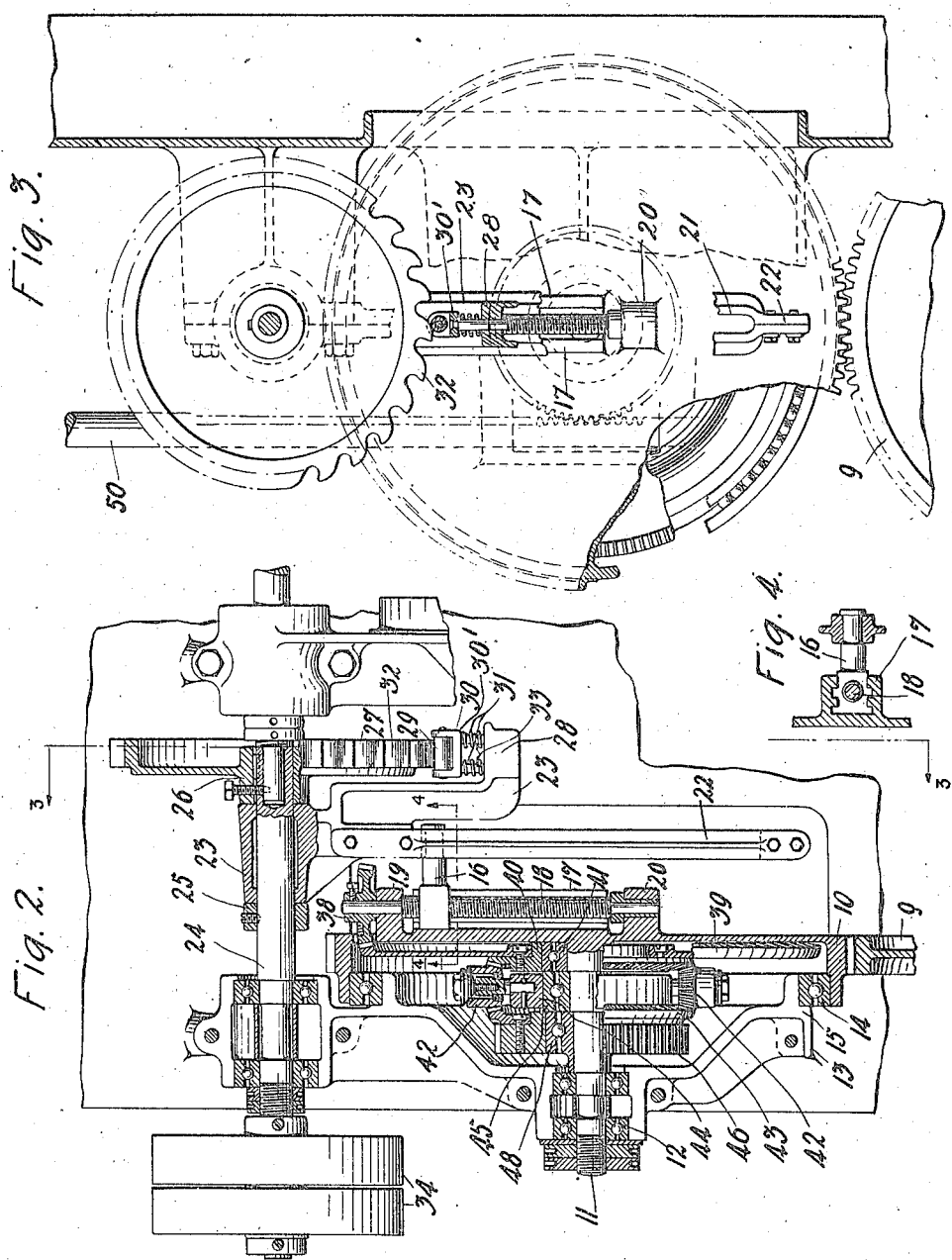

W. E. THOMAS.
VARIABLE SPEED TRANSMISSION MECHANISM.
APPLICATION FILED JUNE 23, 1917.
1,254,743.
Patented Jan. 29, 1918.
3 SHEETS—SHEET 3.
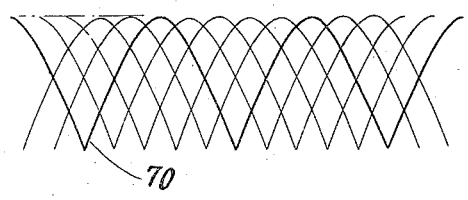
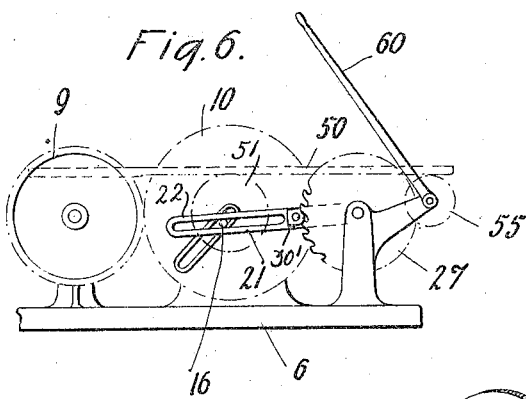
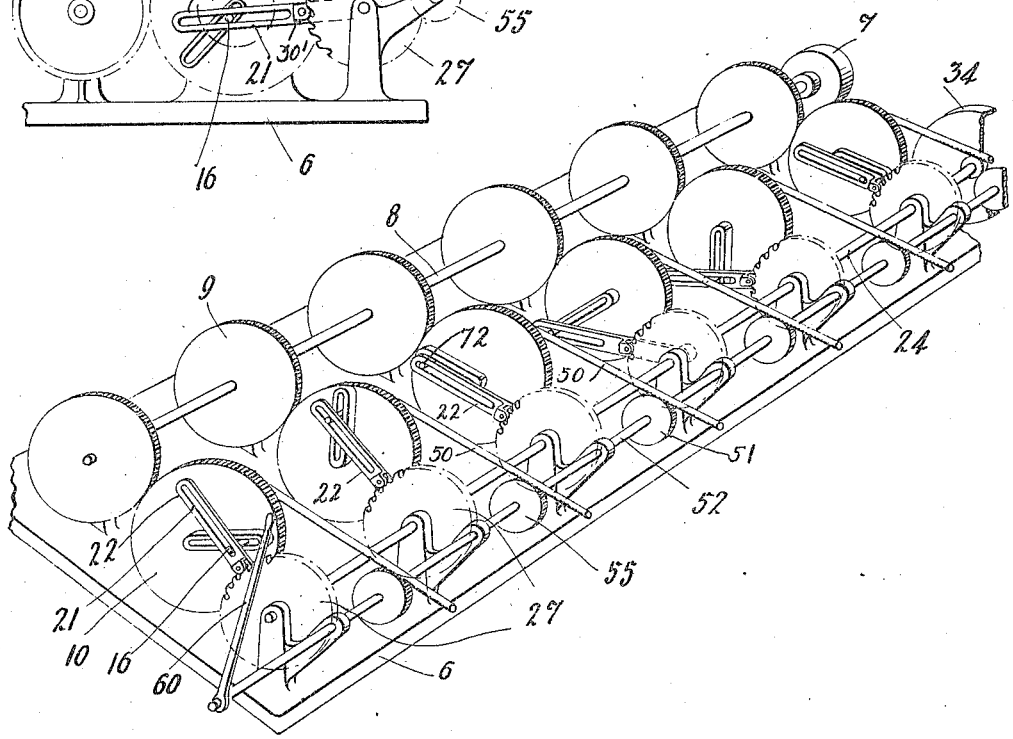
Inventor
William E. Thomas

UNITED STATES PATENT OFFICE.

WILLIAM ELFORD THOMAS, OF BROOKLYN, NEW YORK.

VARIABLE-SPEED TRANSMISSION MECHANISM.

1,254,743.  Specification of Letters Patent.  Patented Jan. 29, 1918.

Application filed June 23, 1917. Serial No. 176,536.

*To all whom it may concern:*

Be it known that I, WILLIAM ELFORD THOMAS, a citizen of the United States, and a resident of Brooklyn, in the county of Kings and State of New York, have invented certain new and useful Improvements in Variable-Speed Transmission Mechanisms, of which the following is a full, clear, concise, and exact description.

This invention relates to variable speed transmission mechanisms, and more particularly to such mechanisms capable of being adjusted over a large range of speeds.

Its primary object is to provide a simple and positively operating mechanism in which the power transmitted from the driving member to the driven member is utilized to the best advantage for all changes of speed.

Another object of the invention is to provide an easily manipulated speed controlling mechanism which permits of a more accurate adjustment of speed ratios than has heretofore been possible and that is easily manipulated by the operator while the mechanism is in motion.

This invention consists in general of a series of driving gears, each one coupled to an individual gear. Each one of these gears coöperates by means of a lever and ratchet mechanism with a common driven member to impart a continuous rotation thereto by means of equal successive overlapping step-by-step movements. The lever and ratchet mechanisms are all controlled in common by means of a mechanism that may be manipulated to change the length of the stroke of the levers simultaneously and at the same ratio, while the mechanism is in motion.

The invention may be best described in detail by referring to the accompanying drawings, in which Figure 1 is a plan view of the mechanism with parts broken away to avoid too much duplication of similar parts; Fig. 2 is a plan view partly in section of a part of one of the individual driving and speed control mechanisms; Fig. 3 is a side view of the mechanism shown in Fig. 2, also partly in section, taken approximately on the line 3—3 of Fig. 2; Fig. 4 is a fragmentary sectional view taken on the line 4—4 of Fig. 2; Fig. 5 is a simplified perspective view of the mechanism showing the principles involved in its construction; Fig. 6 is a simplified side view of the mechanism, showing especially the principles involved in the speed controlling mechanism; and Fig. 7 shows speed transmission curves produced by the individual lever and ratchet mechanism, and their combined effect on the driven member.

Referring to the drawings, and particularly to Fig. 1, the base 6 has mounted on it the driving motor 7 with its shaft 8, to which is fixed a series of gears 9 of equal diameter. Each one of these gears 9 meshes with individual gears 10 mounted by means of the central shaft 11 on ball bearings 12 in the frame-work 13, and by means of ball bearings 14 on the rim 15, forming part of the framework 13. Fig. 2 shows the construction of an individual driving and speed regulating mechanism, there being in this particular embodiment of the invention six such mechanisms mounted side by side. Referring now to this mechanism the pin 16 is mounted in the slotted guideways 17, projecting from and cut into the face of gear 10, and held rigidly therein by means of the screw 18 (see Fig. 4). Screw 18 is rotatably mounted between lugs 19 and 20, also projecting from the face of gear 10. The free end of pin 16 engages the slot 21 formed by the two parts of lever 22, fastened by bolts to the crank lever 23. This crank lever 23 is loosely mounted on the driven shaft 24 between the collar 25 and the hub 26 of the ratchet wheel 27, which is securely fixed on the shaft 24 by means of a screw. The driven shaft 24 is mounted in bearings between the framework 13. The angular projection 28 of crank lever 23 is provided with a pawl, consisting of a roller 29 mounted in a bracket 30, extending, by means of the lugs 31, into holes in projection 28. This pawl is held in close contact with the teeth 32 on ratchet wheel 27, by means of coiled springs 33 surrounding lugs 31. The shaft 24 is provided at one end with the pulley or fly wheel 34 which may be belted directly to any machine requiring changing rates of speed.

The part of the speed regulating and control mechanism individual to the structure, shown in Fig. 2, consists of the bevel gear pinion 38, fixedly mounted on the outer end of screw 18, and geared to the bevel gear 39, which in turn is riveted to the bevel gear 40, mounted with ball bearings 41 on shaft 11. Bevel gears 40 and 43 mesh with the two pinions 42, rotatably mounted diametrically opposite to each other on the ring 44, which in turn is mounted with ball bearings 45 on shaft 11. The gear 46, also mounted on shaft 11 by means of ball bearings 48, is secured to gear 43. The gear 46 of the individual driving and speed control structures are coupled together by means of the individual racks 50 (see Figs. 1 and 3), that in turn are coupled to their individual gears 51, mounted on the shaft 52. The racks 50 are mounted at one end in brackets 53 projecting from the base plates 6, and at the opposite end in frames 13. The shaft 52 is also mounted between brackets 53, as shown in Figs. 1 and 5. Shaft 52 is coupled by means of gears 55 and 56 to shaft 58, that in turn is operated by lever 60. Lever 60 is provided with a pointer 62 opposite an indicating scale 63 fastened to the mounting bracket 64, which also serves as a support for shaft 58.

The operation of the mechanism is as follows: By setting the lever 60 and pointer 62 in certain relation to scale 63 the pins 16 will be shifted, each one individually, through the medium of screw 18, bevel gears 38, 39 and 40, pinions 42, bevel gear 43, gear 46, rack 50, and gear 51, and commonly through the medium of shaft 52, gears 55 and 56 and shaft 58, to a corresponding distance from the center of gear wheels 10. This position of pins 16 determines the extent of the angular movement of the levers 22, and consequently a corresponding angular movement of the pawls 30', which in turn are thereby capable of rotating the ratchet wheels 27 an equal distance.

Referring to Fig. 5 it will be seen that the pins 16 are so placed in relation to each other that levers 22 will be affected by the rotation of the gears 10, in equal successively overlapping oscillating movements. These oscillating movements of the levers impart to their respective ratchet wheels step-by-step movements that result in a practically continuous rotation of the shaft 24. This continuous rotary motion of the shaft 24 is illustrated in Fig. 7, where the speed of the levers from a state of rest to a maximum speed, and back to a state of rest, has been plotted and represented by curves 70 in overlapping succession, and this fact illustrates that the changing speeds given to the wheels 27 result in a combined speed that is practically equal to the maximum speed of the individual levers 22. The speed of the shaft 24 is thereby made practically constant throughout the whole cycle of said operating levers. This is especially true when the speed is comparatively high, and it is apparent that the greater number of levers, pawls and corresponding ratchet wheels used, the more nearly perfectly uniform would the speed become. In this particular embodiment of the invention only six such mechanisms have been shown, but it is to be understood that any number of them may be employed, as the accuracy of performance of a machine demands.

By again referring to Fig. 5 it will be seen that the highest speed of the levers 22 is obtained when the pinions 16 are at a point farthest away from the shaft 24, and thus engage the extreme end of the levers 22, as is for example the case with the lever 22 shown at 72 in Fig. 5. It is also apparent that this point 72 must be the most advantageous point at which to apply moving power to the levers 22, inasmuch as the leverage at this point is the longest possible. It is further evident that as the pins 16 are moved toward the center of gears 10, the extent of the oscillating movements of the levers 22 will decrease, and that the pulling power will increase in a corresponding ratio, due to shortening of the leverage measured from the center of the pins 16 to the common axis of the gears 10.

By this arrangement of levers 22 and pins 16 the most economical use of the power transmitted from the driving shaft 8 to driven shaft 24 is obtained for all variations of speed.

What is claimed is:

1. In a variable speed transmission mechanism, a shaft, a series of gears fixed on said shaft, a second series of gears driven each one individually by a gear in the first series, a second shaft, a series of ratchet wheels fixed on said second shaft, a crank pin on each said second gears arranged in equal angular distances apart around the common axis of said gears, a lever for each of said crank pins, said levers being arranged to rock in overlapping succession, a pawl on each of said levers for imparting once during each rocking movement, a stepping movement to a corresponding ratchet wheel, and means for adjusting simultaneously the radial distance of said pins from the common axis of said second gears to change the speed of said ratchet wheels in relation to that of the second gears.

2. In a variable speed transmission mechanism, a driving means, a series of driven members, a lever for each of said members, a pawl on each of said levers coöperating with a driven member, a series of crank pins on said driving means each adapted to independently oscillate a lever, a gear mechanism individual to each pin for holding them in fixed relation to said driving means, and a common gear mechanism coöperating with each said individual gear mechanisms for changing said fixed relations simultaneously in the same ratio while the mechanism is in motion.

3. In a variable speed transmission mechanism, a shaft, a series of gears on said shaft, a second series of gears driven each one individually by a gear in the first series, a second shaft, a series of ratchet wheels fixed on said second shaft, a crank pin on each said second gears arranged in equal angular distances apart around the common axis of said gears, a lever for each of said crank pins, said levers being arranged to rock in overlapping succession, a pawl on each of said levers for imparting once during each rocking movement a stepping movement to a corresponding ratchet wheel, a mechanism on each of said second gears for adjusting the radial distance of said pins from the axis of the gears, and a means for operating said mechanisms simultaneously to change to an equal degree the extent of the rocking movements of said levers.

4. In a variable speed transmission mechanism, a driving means, a series of driven members, a lever for each of said members, a pawl on each of said levers coöperating with the corresponding driven member, individual means on said driving means for oscillating said levers in overlapping succession, gear mechanisms for holding said individual means in fixed relation to said driving means, and a common gear mechanism coöperating with said individual gear mechanisms for changing simultaneously at the same ratio said fixed relations.

In witness whereof, I hereunto subscribe my name this 20'' day of June, A. D. 1917.

WILLIAM ELFORD THOMAS.

Copies of this patent may be obtained for five cents each, by addressing the "Commissioner of Patents, Washington, D. C."